United States Patent [19]

Suzuki

[11] Patent Number: 5,790,187
[45] Date of Patent: Aug. 4, 1998

[54] FILM HOLDER, IMAGE READING DEVICE AND METHOD FOR READING A FILM ORIGINAL WITH AN IMAGE READING DEVICE

[75] Inventor: Maki Suzuki, Chiba-ken, Japan

[73] Assignee: Nikon Corporation, Tokyo, Japan

[21] Appl. No.: 570,609

[22] Filed: Dec. 11, 1995

[30] Foreign Application Priority Data

Dec. 13, 1994 [JP] Japan .................................. 6-308562
Jul. 25, 1995 [JP] Japan .................................. 7-187602

[51] Int. Cl.⁶ ........................................... H04N 07/18
[52] U.S. Cl. ................. 348/96; 348/97; 348/102; 348/105; 355/76; 355/77
[58] Field of Search ........................... 348/96, 97, 102, 348/105, 111, 112, 107, 110; 354/283, 284, 287; 355/76, 75, 72, 77, 122, 123

[56] References Cited

U.S. PATENT DOCUMENTS

| | | | |
|---|---|---|---|
| 4,458,270 | 7/1984 | Kuno et al. ........................ | 358/225 |
| 4,804,989 | 2/1989 | Kumanomido ...................... | 354/283 |
| 5,113,268 | 5/1992 | Yoshida et al. .................... | 358/474 |
| 5,128,714 | 7/1992 | Kishino ............................. | 355/75 |
| 5,239,392 | 8/1993 | Suzuki et al. ..................... | 348/107 |
| 5,448,377 | 9/1995 | Kinoshita et al. .................. | 358/453 |
| 5,568,225 | 10/1996 | Tazawa et al. ..................... | 355/76 |

FOREIGN PATENT DOCUMENTS

A-7-110533  4/1995  Japan.

*Primary Examiner*—Tommy P. Chin
*Attorney, Agent, or Firm*—Oliff & Berridge, PLC

[57] ABSTRACT

A film holder holds a film original and an image reading device uses the film holder for the purpose of easily changing the frames of the film original. The film holder is provided with a holder main body and an adapter. The holder main body holds the film original and has a plurality of openings that face the images of each frame of the film original. The adapter holds the holder main body so that sliding is possible along a length of the film original and has windows that coincide with at least one of the plurality of openings of the holder main body.

19 Claims, 11 Drawing Sheets

FILM HOLDER, IMAGE READING DEVICE AND METHOD FOR READING A FILM ORIGINAL WITH AN IMAGE READING DEVICE

BACKGROUND OF THE INVENTION

1. Field of the Invention

The present invention relates to a film holder that holds a film original, an image reading device having a film holder and a method for reading a film with an image reading device.

2. Description of Related Art

Film holders such as the one shown in FIG. 10, for example, have been used as film original document holders.

FIG. 10 is an isometric view showing an open state of one type of conventional film holder. A conventional film holder 300 holds a 35 mm size film strip 310 interposed between front and back surfaces of the film holder 300. The film strip 310 has the images 311 of five frames lengthwise arranged in a row in a film insertion direction.

The film holder 300 includes a receptor unit 320 onto which the film strip 310 is loaded. A cover 340 is connected to the receptor unit 320 by means of a hinge 330. The receptor unit 320 and the cover 340 form a symmetric shape by means of the hinge 330, and the film strip 310 is interposed between the front and back surfaces of the receptor unit 320 and cover 340, as shown in FIG. 10.

The receptor unit 320 and the cover 340 are provided with wide-width portions 321 and 341, respectively, that have widths wider than the film strip 310, and narrow-width portions 322 and 342 that are narrower than the respective wide-width portions 321 and 341. Each portion 321, 341 also has an extended portion having substantially the same width as the width of the film strip 310, as shown in FIG. 10.

Furthermore, step sections 323 and 343 are formed between the wide-width portions 321 and 341 and the narrow-width portions 322 and 342, as shown in FIG. 10. The step sections 323 and 343 are used to stop the film holder in an insertion stop position within an image reading device, and also serve as a pushing surface to cause ejection of the film strip.

Openings 324 and 344, having substantially the same size as the image 311 of one frame of the film strip 310, are formed in substantially the center of the direction of length of the receptor unit 320 and the cover 340 so as to pass through the wide-width portions 321 and 341 from top to bottom, as shown in FIG. 10.

In addition, a plurality of protrusions 325 that restrict the position of the film strip 310 in the transverse direction are formed along both transverse edges of the film strip 310 on the top surface of the wide-width portion 321 of the receptor unit 320. A corresponding plurality of holes 345 into which each of the protrusions 325 penetrate are formed on the bottom surface of the wide-width portion 341 of the cover 340.

However, with the above-described conventional film holder 300, when the frame of the image 311 of the film strip 310 is changed, it is necessary to open the film holder 300 and arrange the frame of the next image 311 to be read relative to the openings 324 and 344.

There is a difference between the front and back surfaces of the film strip 310. Consequently, when the front and back surfaces of the film strip 310 are reversed, the characters shown in the image 311 are displayed backwards.

The front and back surfaces of the film strip 310 can be reversed by inserting the film holder 300 into the image reading device while mistaking the front surface for the back surface. This causes the image 311 to be reversed front to back when read. Consequently, it is necessary to remove the film holder 300, reverse the film holder front and back and then to insert the film holder back into the image reading device. This also causes inefficiency because time is required for reading an image once, removing and reinserting the film, and reading the image once again.

SUMMARY OF THE INVENTION

The present invention has been made in consideration of the above-described problems of the prior art.

A first object of the invention is to provide a film holder in which it is possible to easily change the frame of the film original.

A second object of the invention is to provide a film holder in which position determination during film advancement is easy.

A third object of the invention is to provide a film holder with which it is possible to prevent deviances in position when changing the film original.

A fourth object of the invention is to provide a film holder with which it is easy to change the frames of the film original by merely changing the direction of insertion of an adapter.

A fifth object of the invention is to provide a film holder with which it is possible to identify the front and back surfaces of the film original by an identification mark formed on the film holder.

A sixth object of the invention is to provide a film holder with which it is easy to detect the identification mark by forming the identification mark in a non-sliding adapter.

A seventh object of the invention is to provide a film holder with which it is possible to identify the front and back surfaces of the film holder from the external appearance of the film holder by providing the identification mark using notches.

An eighth object of the invention is to provide an image reading device using a film holder in which changing of the film holder is unnecessary.

In a first embodiment of the invention, there is provided a film holder for holding a film original having a plurality of frames arranged in a row. The film holder comprises a holder main body capable of holding the film original, the holder main body having a plurality of openings that face each of the plurality of frames of the film original and an adapter capable of slidingly holding the holder main body, the adapter having a plurality of windows that selectively coincide with at least one of the plurality of openings of the holder main body.

The adapter may hold the holder main body so that sliding is possible along the direction of length of the film original. The adapter may also have a plurality of windows that coordinate with at least one of the plurality of openings of the holder main body. The number of windows is shown to be 2, for instance, but this is intended to be illustrative and not limiting. It would also be appropriate for this number to be 1 or 3.

A temporary stop device may be provided between the holder main body and the adapter. The temporary stop device regulates the sliding of the holder main body relative to the adapter at each stop position where the position of one of the plurality of openings of the holder main body and the plurality of windows of the adapter mutually coincide.

The temporary stop device may include position-determining grooves formed in the adapter side and stop hooks formed in the holder main body side. It would also be appropriate to form one out of mutually interlocking protrusions and indentations on either the holder main body or the adapter.

The holder main body may include a holder bottom portion and a holder cover. The holder bottom portion holds the bottom surface of the film original. The holder cover overlaps with the holder bottom portion opposite the film original. The film original is thus interposed and held between the cover and the holder bottom portion.

The adapter may include an adapter bottom portion and an adapter cover. The adapter bottom portion holds the holder bottom portion from the outside so that sliding is possible. The adapter cover may be connected to the adapter bottom portion via a hinge so as to be capable of opening and closing, and may hold the holder cover from the outside so that sliding is possible.

A slide preventing device may be provided between the holder main body and the adapter main body. The slide preventing device prevents sliding of the holder main body relative to the adapter when the adapter bottom portion and the adapter cover are in the state of being opened using the hinge.

The slide preventing device may include an engagement stop groove formed on the adapter side, and an engagement stop hook formed on the holder main body side. It would also be appropriate for one out of the mutually interlocking protrusion and indentation to be formed on the holder main body or the adapter. Furthermore, the invention is not limited to protrusions and indentations, for it would also be appropriate to prevent sliding using frictional resistance.

A pair of windows may be formed on the adapter at positions separated from each other by a plurality of frames of the film original.

An instruction mark, for example, an instruction window indicating the direction of insertion of the adapter, may be displayed on the adapter. It would also be appropriate for a protrusion to be formed on the front surface of the adapter, or to adhere a seal which bears a printed arrow to the front surface of the adapter. An identification mark that is used to identify the front and back surfaces of the film original (e.g., notch) may be formed on either the holder main body or the adapter.

The identification mark may be formed on the adapter side, for example, but this is intended to be illustrative and not limiting, for it would also be appropriate to form this on the holder main body side, or on both the holder main body and the adapter.

Notches may be formed as the identification mark, for example, but it would also be appropriate to form indentations, protrusions, grooves or holes. Furthermore, it would also be appropriate to adhere magnetic tape to the front surface of the adapter without directly forming the mark on the adapter and to magnetically read the mark. In addition, the tape is not limited to magnetic tape, for it would also be appropriate to attach tape in which the reflectivity changes, and to optically read the tape.

Identification marks may be formed on the ends of the adapter in the direction of insertion. The identification marks may be formed on both ends of the adapter in the direction of insertion, but it would also be appropriate for a mark to be formed on only one of the ends. The identification mark may include notches.

In a second embodiment of the invention, there is provided an image reading device for reading film original having a plurality of frames arranged in a row. The image reading device comprises a film holder having a holder main body capable of holding the film original, the holder main body having a plurality of openings that face each of the plurality of frames of the film original and an adapter capable of slidingly holding the holder main body, the adaptor having a plurality of windows coinciding with at least one of the plurality of openings of the holder main body; and a scanning unit for scanning the film within the film holder.

An identification mark detection device and an image data reversing device may be provided in the image reading device. The identification mark detection device detects the identification marks on the film holder. The identification mark detection device may include an optical sensor, for example, but this is intended to be illustrative and not limiting, for it would also be appropriate to use a mechanical or magnetic detection devices. The image data reversing device determines the front and back direction of the inserted film holder using a detection signal that is detected by the identification mark detection device, and reverses the front and back direction of the image data that is read upon the condition that the film holder is inserted from the back surface direction.

In a third embodiment of the invention, there is provided a method for reading a film having a plurality of frames with an image reading device having a holder main body including a plurality of openings and an adapter including a plurality of windows, the film being inserted between the holder main body and the adapter. The method comprises aligning at least one of the plurality of openings to coincide with a corresponding one of the plurality of windows to form a coinciding opening, reading an image of a selected frame of the film that faces the coinciding opening, and sliding the holder main body relative to the adapter to align a different one of the plurality of openings to coincide with a corresponding different one of the plurality of windows.

In a fourth embodiment of the invention, there is provided an apparatus for reading a film having a plurality of frames. The film is interposed between a holder main body including a plurality of openings and an adapter including a plurality of windows. The apparatus comprises a device for aligning at least one of the plurality of openings to coincide with a corresponding one of the plurality of windows to form a coinciding opening; a device for reading an image of a selected frame of the film that faces the coinciding opening; and a device for sliding the holder main body relative to the adapter to align a different one of the plurality of openings to coincide with a corresponding different one of the plurality of windows.

The film original may be a 35 mm size film, but this is intended to be illustrative and not limiting. It would also be appropriate to use so-called Brownie size film or film sizes other than 35 mm. In addition, the number of frames of the film original is shown using an example having 6 frames, but this is intended to be illustrative and not limiting. It would also be appropriate to have 1, 2–5 or 7 or more frames. Further, the number of openings is shown to match the number of frames of the film original, but this is intended to be illustrative and not limiting. It would also be appropriate for the number of openings to be smaller than the number of frames of the film original, or to be greater than the number frames of the film original.

Next, operation of the various aspects of the invention will be discussed.

With the first embodiment, it is possible to change the frames of the film original by causing the holder main body to slide relative to the adapter. First, at least one of the openings out of the plurality of openings of the holder main body is caused to coincide with the windows of the adapter, and it is then possible to read the image of the film original that faces this opening.

In order to change frames, it is preferable to cause the holder main body to slide relative to the adapter, and to cause a different opening of the holder main body to coincide with the windows of the adapter.

During sliding of the holder main body, the sliding of the holder main body is restricted by the temporary stop device at positions where the openings and the windows of the adapter mutually coincide. Consequently, positioning by the user sliding the holder main body is easy.

When loading the film original in the holder main body with the adapter open, sliding of the holder main body relative to the adapter is prevented by the slide preventing device.

It is possible to prevent deviances in position when changing the film original.

It is possible to change frames of the film original with ease by inserting the adapter in accordance with the instruction mark (e.g., the instruction window), or by changing the direction of inserting the adapter in accordance with the instruction mark (e.g., the instruction window.

It is possible to identify the front and back surfaces of the film original through identification marks (e.g., notches).

Because the identification marks (e.g. notches) are formed on the adapter side, shown in FIG. 7 the position of the identification marks (e.g. a notches) do not move by the sliding of the holder main body.

The identification mark is composed of a notches, as shown in FIG. 7, and consequently, the front and back direction of the film original is clear even from external appearance.

When the film holder is inserted into the image reading device, the identification marks (e.g. notches) of the film holder are detected by the identification mark detection device. When the identification mark (e.g. a notch) is detected by the identification mark detection device, a detection signal is output from the identification mark detection device to the image data reversing device.

The image data reversing device determines the front and back direction of the inserted film holder through the detection signal output from the identification mark detection device.

As a result, when it is detected that the film holder has been inserted from the back surface direction, the image data reversing device reverses the front-to-back direction of the image data that is read when a detection signal is not output from the identification mark detection device to the image data reversing device following insertion of the film holder.

BRIEF DESCRIPTION OF THE DRAWINGS

Preferred embodiments of the present invention will now be described with reference to the drawings, wherein.

DETAILED DESCRIPTION OF PREFERRED EMBODIMENTS

FIGS. 1 through 6 show a first embodiment of the present invention.

Figure 1:
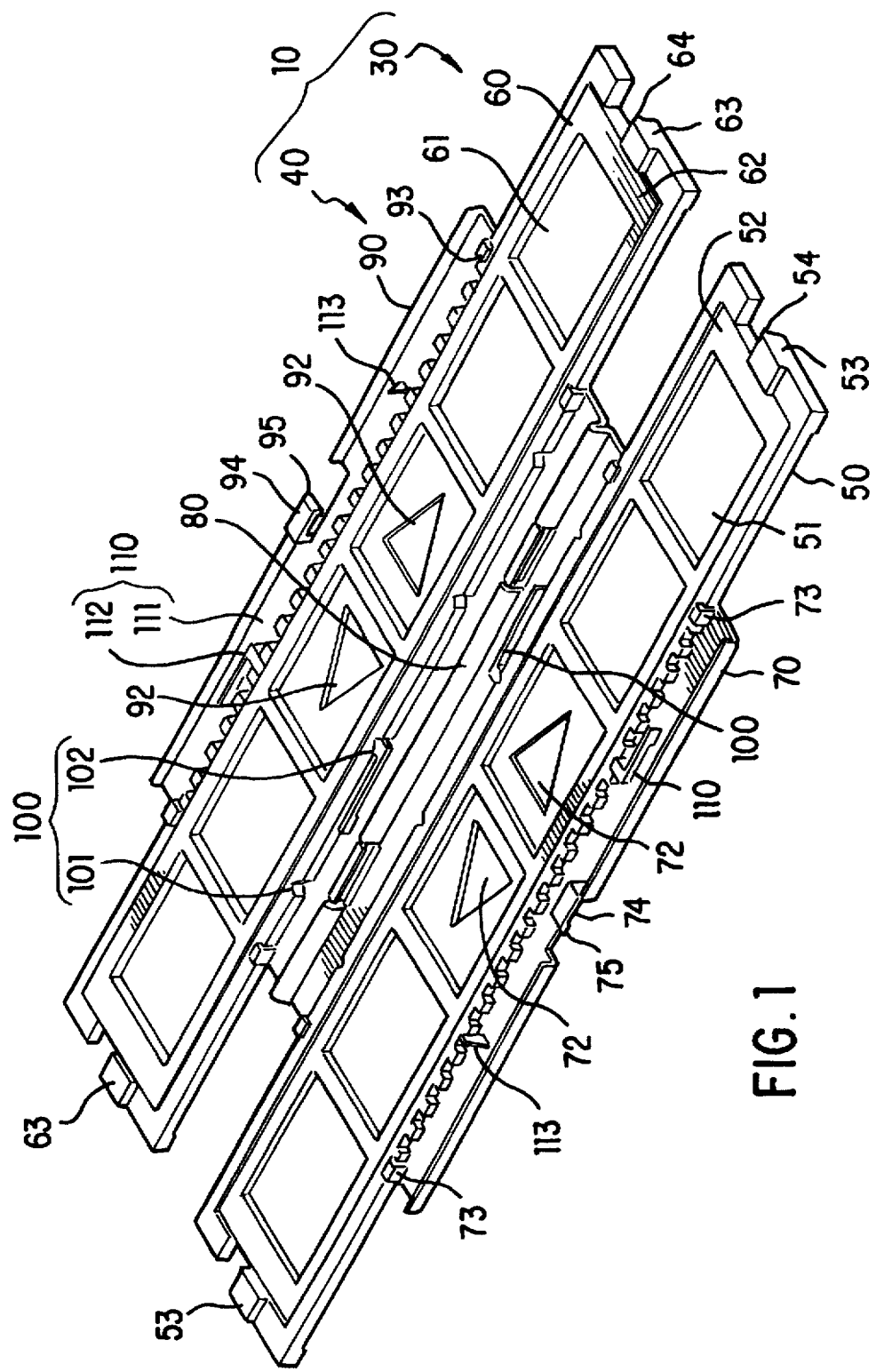
FIG. 1 is a perspective view showing the opened state of a film holder according to the present invention.

In FIG. 1, a film holder 10 holds a film original having images of a plurality of frames arranged in a row in a lengthwise direction of the film. For example, a 35 mm size film strip is cut into segments having six frames. Furthermore, the film holder 10 is loaded into an image reading device 20, such as the one shown in FIG. 2, and the images of the film strip are then read.

A 35 mm size film is presented as an example of the above-described film strip, but it would also be appropriate for the film to be a Brownie size film. In addition, the number of frames is not limited to 6 frames, because it would be appropriate if the film had only 1 frame.

First, the film holder 10 will be described with reference to FIGS. 1 and 3 through 5.

Figure 3:
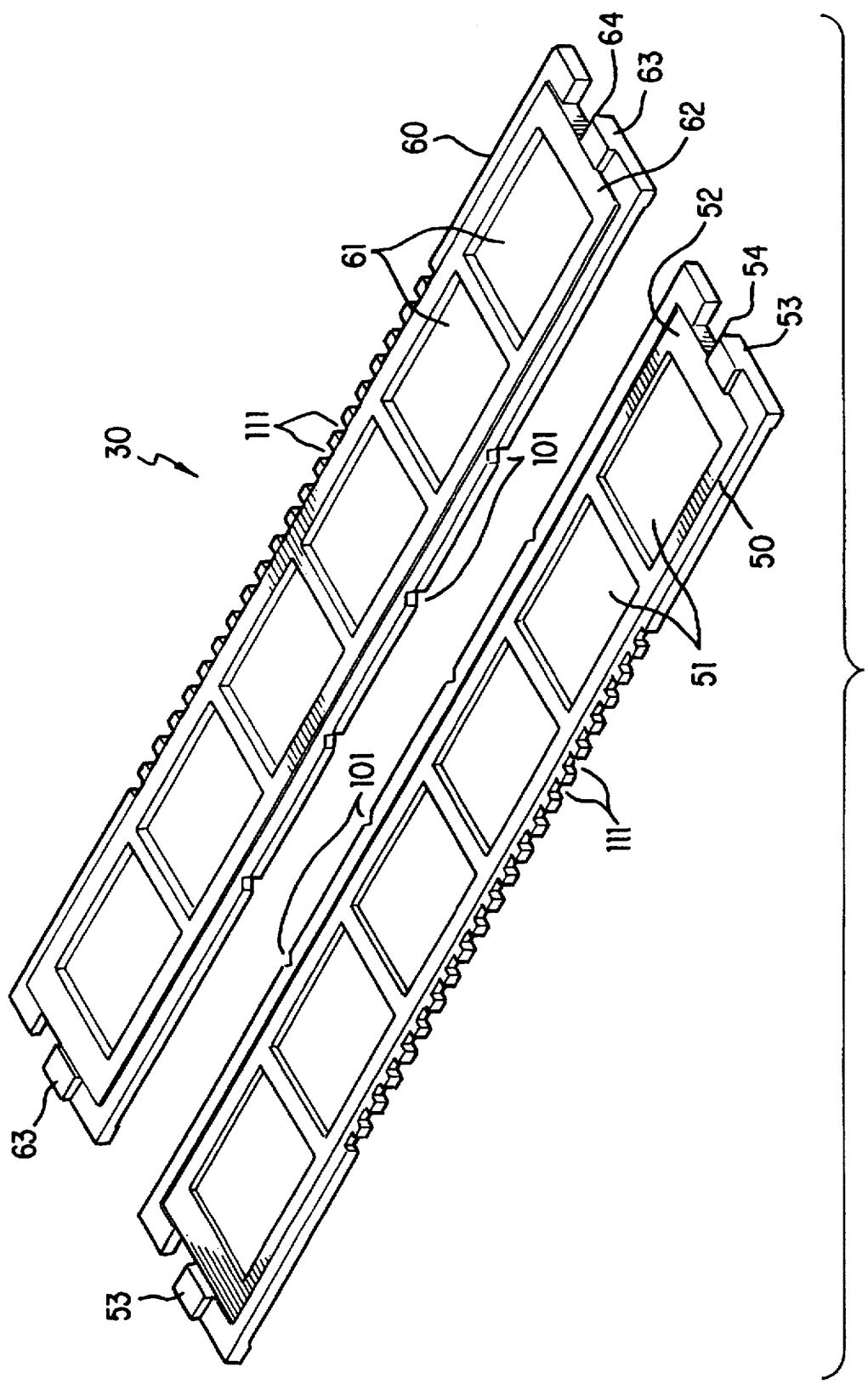
FIG. 3 is a disassembled perspective view of the holder main body according to the present invention.
Figure 4:
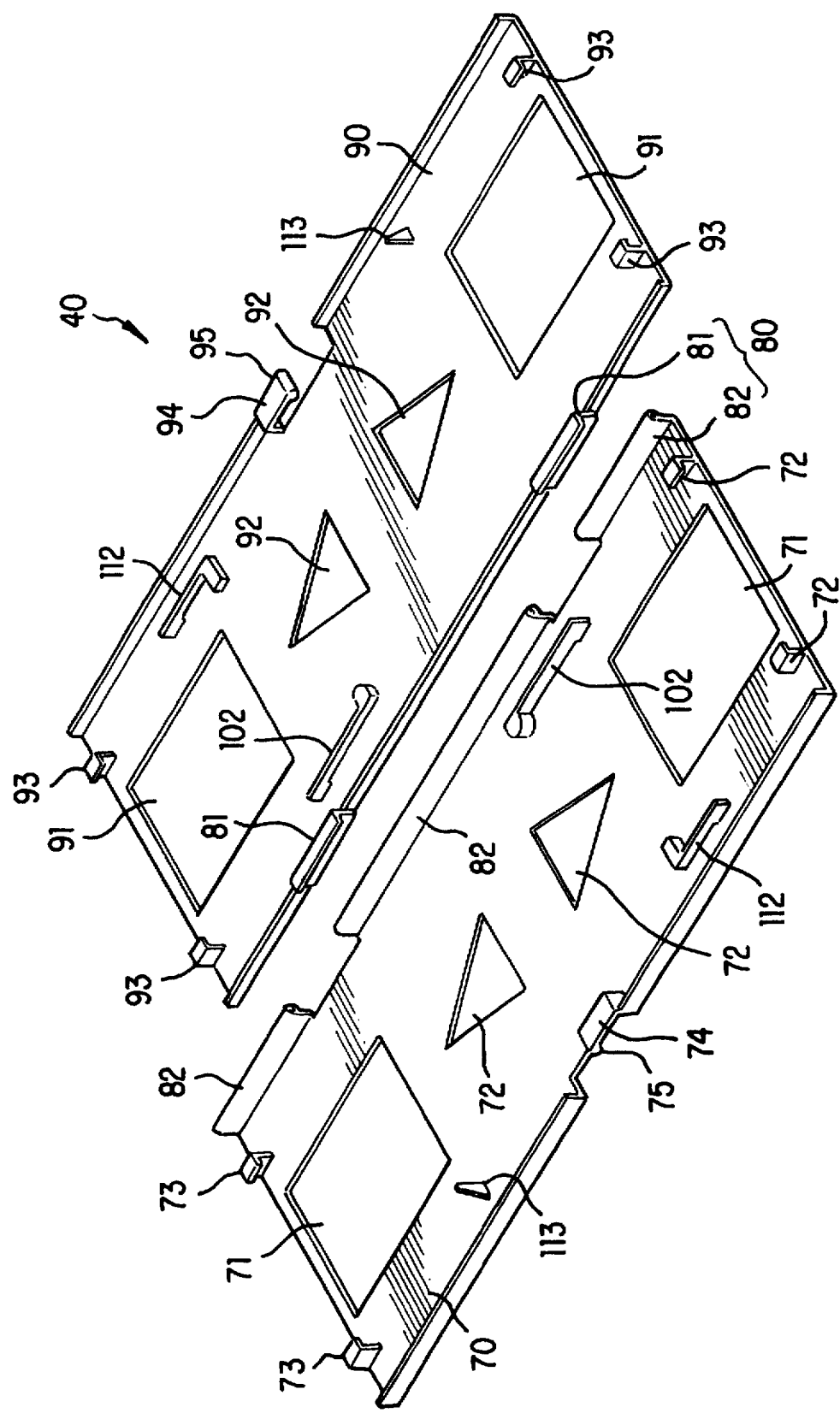
FIG. 4 is a disassembled perspective view of an adapter according to the present invention.
Figure 5:
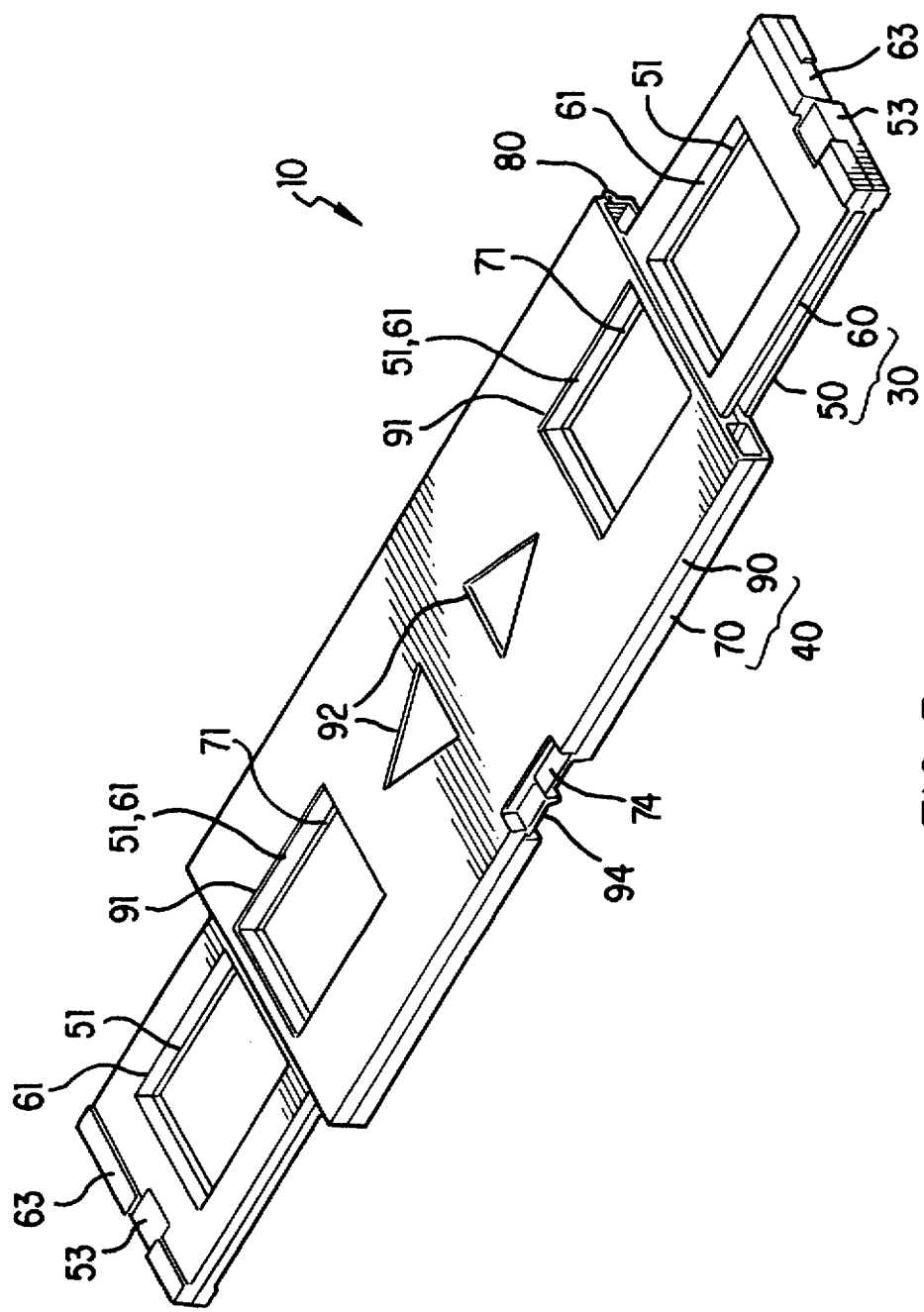
FIG. 5 is a perspective view showing the closed state of the film holder according to the present invention.

As shown in FIGS. 1, 3 and 4, the above-described film holder 10 can be roughly divided into a holder main body 30 that holds the film strip and has a plurality of openings 51 and 61 that face the image of each frame of the film strip, and an adapter 40 that holds the holder main body 30 so that sliding is possible in the lengthwise direction of the film. Adapter 40 has windows 71 and 91 that coincide with at least a respective one of the plurality of openings 51 and 61 of the holder main body 30.

The holder main body 30 includes a holder bottom portion 50 that holds the bottom surface of the film strip and a holder cover 60 that overlaps the holder bottom portion 50 opposite the film strip and holds the film strip interposed between the cover and the holder bottom portion 50.

The adapter 40 includes an adapter bottom portion 70 that holds the holder bottom portion 30 from the outside so that sliding is possible. An adapter cover 90 is connected to the adapter bottom portion 70 by a hinge 80 so that opening and closing are possible. Adapter cover 90 holds the holder cover 60 from the outside so that sliding is possible.

The holder bottom portion 50 and holder cover 60 are substantially symmetrically oriented with respect to the hinge 80 of the adapter 40.

In addition, the total length of the holder bottom portion 50 and the holder cover 60 is set slightly longer than the total length of a film strip having 6 frames. Naturally, it is also possible to freely set the total length of the holder bottom portion 50 and the holder cover 60 on the basis of the number of frames of the film strip that is used.

Furthermore, within holder bottom portion 50 and holder cover 60 are formed 6 rectangular openings 51 and 61, respectively, that coincide with the number of frames of the film strip and that are compatible with the images on the film strip. On the top surface of the holder bottom portion 50, a depression 52 is formed into which the film strip fits. On both ends of the holder bottom portion 50 in the direction of film insertion, main body engagement stop units 53 are formed that engagingly stop the holder cover 60. Furthermore, engagement stop protrusions 54 are formed in each of the main body engagement stop units 53.

On the top surface of the holder cover 60, a protuberance 62 is formed that fits into the depression 52 of the holder bottom portion 50. The protuberance 62 fits into the depression 52, so that the film strip is interposed between the depression 52 and the protuberance 62.

On both ends of the holder cover 60 in the direction of film insertion, main body engagement units 63 are formed that engage with the main body engagement stop units 53 of the holder bottom portion. On each main body engagement unit 63 are formed engagement stop protrusions 64 that lock the holder bottom portion 50 and the holder cover 60 in a closed state by being offset from the engagement stop protrusions 54 of the main body engagement stop units 53.

The adapter bottom portion 70 and the adapter cover 90 have a substantially symmetric form with the hinge 80 interposed there-between. The total length of the adapter bottom portion 70 and the adapter cover 90 is set so as to be substantially the same as the total length of a film strip having four frames.

Furthermore, each end of the adapter bottom portion 70 and the adapter cover 90 includes two rectangular windows 71 and 91, respectively, that are compatible with the two openings 51 and 61 in the holder main body 30 that are separated by two frames. Consequently, the two openings 51 and 61 of the holder main body 30 face the two windows 71 and 91 of the adapter 40.

Between the two windows 71 and 91 of the adapter bottom portion 70 and the adapter cover 90, two triangular instruction windows 72 and 92 are formed that face the two adjacent openings 51 and 61 of the holder main body. The two instruction windows 72 and 92 are positioned so that the pointed ends of the triangles face outward and the windows designate the direction of insertion of the film holder 10 relative to the image reading device 20.

The instruction marks are not limited to the instruction windows 72 and 92 because it would also be appropriate to print an arrow or the like on the top surface of the adapter 40.

A plurality of slide holding units 73 are formed on the top surface of the adapter bottom portion 70. The plurality of slide holding units 73 are positioned at both edges along the direction of sliding of the holder bottom portion 50. Each slide holding unit 73 protrudes from the top surface of the adapter bottom portion 70 with an L-shaped cross section. Furthermore, the holder bottom portion 50 is inserted into the space between mutually opposing slide holding units 73 and is held by the slide holding units 73 so as to be capable of sliding relative to the adapter bottom portion 70.

In addition, an adapter engagement stop unit 74 for engagingly stopping the adapter cover 90 is formed on the edge of the adapter bottom portion 70 opposite the hinge 80. An engagement stop protrusion 75 is formed in the adapter engagement stop unit 74.

A plurality of slide holding units 93, for example four, are formed on the top surface of the adapter cover 90 at positions on both edges along the direction of sliding of the holder cover 60. Each slide holding unit 93 protrudes from the top surface of the adapter 90 and has an L-shaped cross section. Furthermore, the holder cover 60 is inserted into the space between mutually opposing slide holding units 93, and is held by the slide holding units 93 so as to be capable of sliding relative to the adapter cover 90.

An adapter engagement unit 94 is formed on the edge of the adapter cover 90 opposite the hinge 80 that engages with the adapter engagement stop unit 74 of the adapter bottom portion 70. An engagement protrusion 95 is formed on the adapter engagement unit 94 that locks the adapter bottom portion 70 and the adapter cover 90 in a closed state by being offset from the engagement stop protrusions 75 of the adapter engagement stop unit 94.

The hinge 80 includes a hinge axle 81 that is formed on the adapter cover 90, and a hinge bearing 82 is supported by the hinge axle 81 and formed on the adapter bottom portion 70. Consequently, the adapter bottom portion 70 and the adapter cover 90 can open and close in an unfolding manner about the hinge axle 81.

A temporary stop device 100 that restricts the sliding of the holder main body 30 relative to the adapter 40 is formed at each stop position where the position of one of the plurality of openings 51 and 61 of the holder main body 30 coincides with the position of the window 71 and 91 of the adapter 40.

The temporary stop device 100 includes a plurality of position-determining grooves 101, for example four, that are each formed along the edges of the holder bottom portion 50 and the holder cover 60 that mutually face each other, and stop hooks 102 are formed on the adapter bottom portion 70 and the adapter cover 90 facing one of the four position-determining grooves 101.

The position-determining grooves are formed in "V" shapes on the edge surface of the holder bottom portion 50 and the holder cover 60 that mutually face each other. Furthermore, the four position-determining grooves are positioned substantially at the center of the four openings 51 and 61 in the center of the holder bottom portion 50 and the holder cover 60.

Each stop hook 102 protrudes upward from the top surface of either the adapter bottom portion 70 or the adapter cover 90, with the flat surface bent roughly into an L-shape, and the tip free edge having a triangular shape elastically fits into each position-determining groove 101. The two stop hooks 102 of the adapter bottom portion 70 and the adapter cover 90 are separated left-to-right so as to not interfere with each other during the closing of the adapter bottom portion 70 and the adapter cover 90.

The position where each of the stop hooks 102 fits into each of the position-determining holes 101, the positions of the openings 51 and 61 and the windows 71 and 91 all mutually coincide. In addition, each of the stop hooks 102 elastically fits into each of the position-determining holes 101. When the attempt is made to cause the holder bottom portion 50 to slide relative to the adapter bottom portion 70 and to cause the holder cover 60 to slide relative to the adapter cover 90, each of the stop hooks 102 is released from each of the position-determining grooves 101.

Next, a click feeling is provided to the user who is sliding the holder main body 30 relative to the adapter 40 at the time when each of the stop hooks 102 elastically fits into each of the adjacent position-determining holes.

With the embodiment shown in the drawings, position-determining grooves 101 are formed in the holder main body 30 and stop hooks 102 are formed in the adapter 40 as the temporary stop means 100, but it would also be appropriate to form position-determining grooves in the adapter 40 and to form stop hooks 102 in the holder main body 30.

A slide preventing device 110 is provided between the holder main body 30 and the adapter 40 to prevent the holder main body 30 from sliding relative to the adapter 40 when the adapter bottom portion 70 and the adapter cover 90 are in an opened state.

The slide preventing device 110 includes, as shown in FIGS. 1, 3 and 4, a plurality of engagement stop grooves 111 that are formed along the edges of the holder bottom portion 50 and the holder cover 60 that mutually face each other. Engagement hooks 112 fit into one of the engagement stop grooves 111 and are formed on the adapter bottom portion 70 and the adapter cover 90. Withdrawal hooks 113 are formed on the adapter bottom portion 70 and the adapter cover 90 and release the engagement stop grooves 111 and the engagement hooks 112. The slide preventing device 110 allows the holder main body 30 to slide relative to the adapter 40 when the adapter bottom portion 70 and the adapter cover 90 are in a closed state.

The engagement stop grooves 111 are formed in a square notch shape in series on the edge surfaces of the holder bottom portion 50 and the holder cover 60 that do not have position-determining grooves 101. The range over which the engagement grooves 111 are formed is within the range of the four openings 51 and 61 in the center of the holder bottom portion 50 and the holder cover 60.

Each of the engagement hooks 112 protrudes upward from the top surfaces of the adapter bottom portion 70 and the adapter cover 90. The flat surfaces are bent roughly into an L shape and the square tip free edge fits into each of the engagement stop grooves 111. The engagement hooks 112 of both the adapter bottom portion 70 and the adapter cover 90 are formed with a lateral separation so as to not interfere with each other when the adapter bottom portion 70 and the adapter cover 90 are closed.

The withdrawal hooks 113 protrude with the shape of a right triangle from the top surfaces of the adapter bottom portion 70 and the adapter cover 90 causing the opposing engagement hooks 112 to be released from the engagement stop grooves 111 by pressing on the hooks when the adapter bottom portion 70 and the adapter cover 90 are closed.

With the embodiment shown in the drawings, engagement stop grooves 111 are formed in the holder main body 30 and engagement hooks 112 and withdrawal hooks 113 are formed on the adapter 40 as the slide preventing device 110, but it would also be appropriate for engagement stop grooves 111 to be formed in the adapter 40 and for engagement hooks 112 and withdrawal hooks 113 to be formed on the holder main body 30.

Next, the operation of the film holder 10 will be described.

First, the adapter bottom portion 70 and the adapter cover 90 are opened and the film strip (not shown) is loaded into the depression 52 of the holder bottom portion 50. At this time, the images of the six frames of the film strip face the six openings 51 of the holder bottom portion 50.

Next, the adapter bottom portion 70 and the adapter cover 90 are closed by causing the adapter cover 90 to rotate about the hinge 80.

At this time, the images of the six frames of the film strip face the six openings 61 of the holder cover 60. Simultaneously, two of the openings 51 and 61 of the holder bottom portion 50 and the holder cover 60 face the two windows 71 and 91 of the adapter bottom portion 70 and the adapter cover 90.

The images of the adjacent two frames positioned between the two openings 51 and 61 can be seen through the two instruction windows 72 and 92 of the adapter bottom portion 70 and the adapter cover 90.

Furthermore, the holder main body 30 can slide a distance equal to two of the openings 51 and 61 relative to the adapter 40. By conducting this two frame slide, it is possible to display the images of three frames relative to each window 71 and 91. Consequently, by inserting the film holder 10 in forward and reverse directions in accordance with the instruction windows 72 and 92, it is possible to read the images on all six frames.

Figure 2:
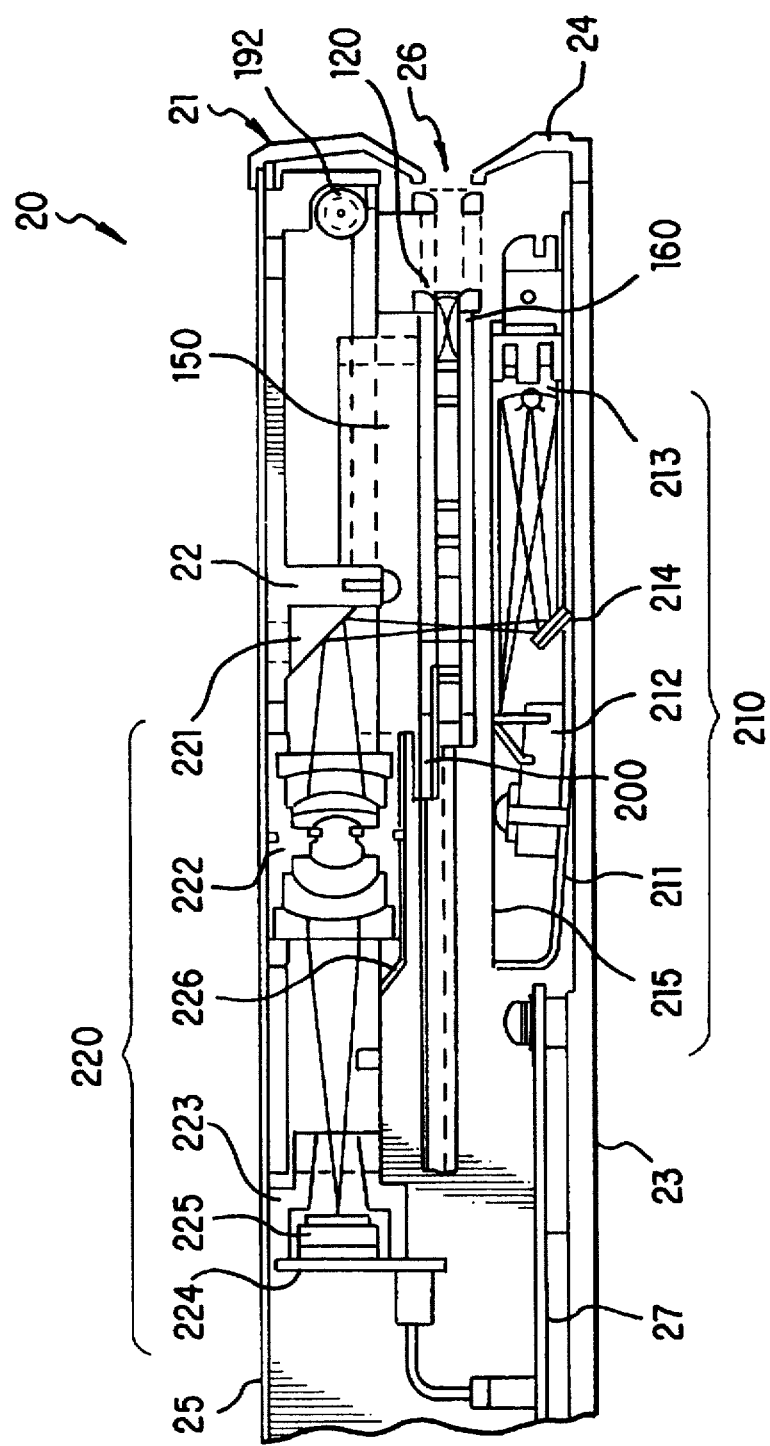
FIG. 2 is an isometric view illustrating an image reading device according to the present invention.
Figure 6:
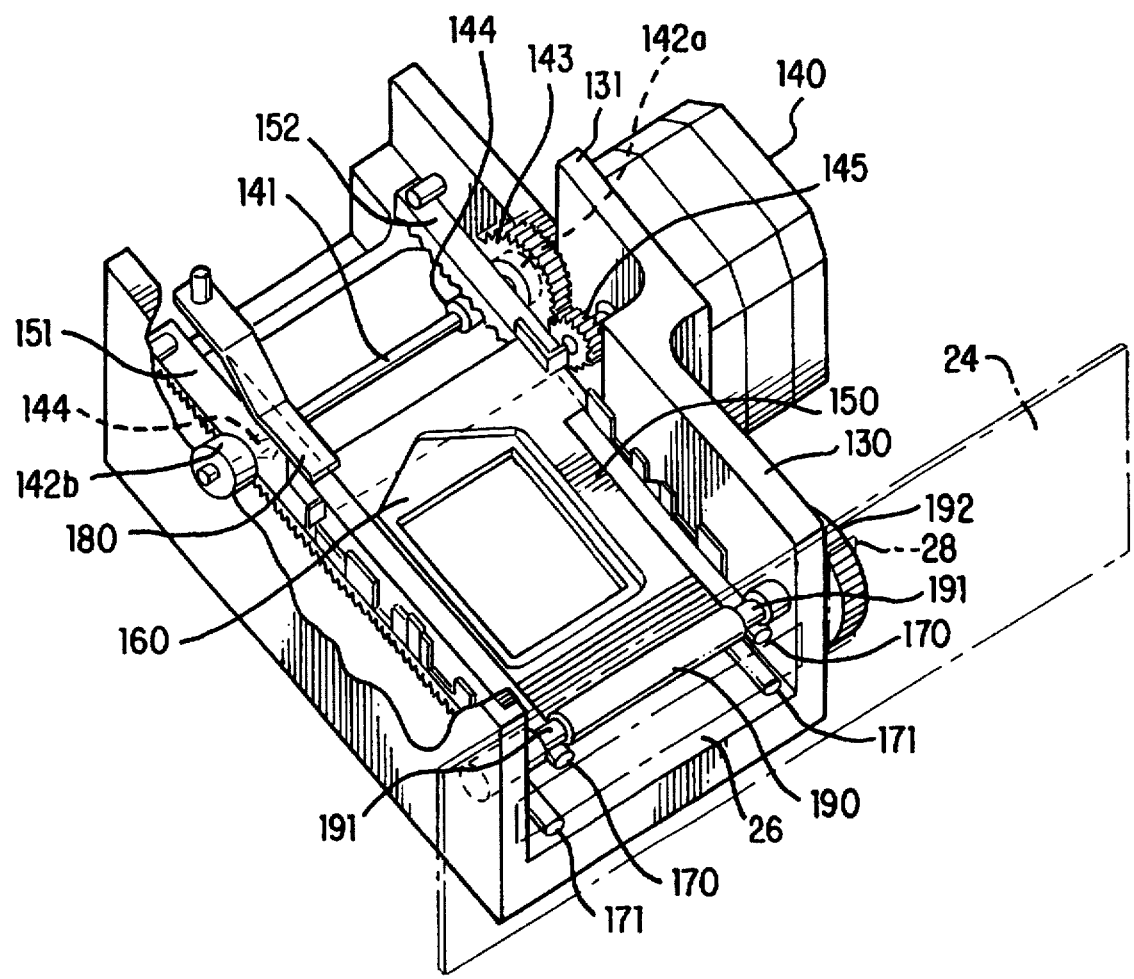
FIG. 6 is an isometric view illustrating a transport mechanism of the film holder of the image reading device as viewed from the bottom.

Next, the image reading device 20 will be described with references to FIGS. 2 and 6.

The image reading device 20 includes a casing 21 and a mechanical chassis 22 that is fixed to the casing.

The casing 21 includes a body 23 that forms a bottom surface, a front panel 24 that is hung vertically from the front surface of the body 23, and a top cover 25 that extends parallel to the body 23 from the top edge of the front panel 24.

In the center of the height of the front panel, an insertion opening 26 is formed that is longer in the horizontal direction and behind the insertion opening 26, a scanning unit 120 is positioned that scans the film holder 10. Farther back from the scanning unit 120, on the bottom surface of the body 23, a main base plate 27 is attached.

The scanning unit 120 includes a housing 130 that contacts one edge of the position facing the insertion opening 26 of the front panel 24 of the casing 21 extending toward the back, and a stepping motor 140 is attached with the output shaft facing the housing 130 from the outside of a flange 131 that is formed on one side wall of the housing 130.

In addition, the housing 130 includes a rack carriage 150 that is driven by the motor 140 and is supported so as to be capable of movement backward from the insertion opening 26 of the front panel 24, and a holder carriage 160 is positioned integrally with the rack carriage with a predetermined spacing so that the film holder 10 is interposed in the space between the holder carriage and the rack carriage 150. A pair of mutually parallel helical racks 151 of module 0.3, for example, having the same width as the rack carriage 150 extend toward the back from the back edge of the rack carriage 150.

At the back position of the flange 131 of the housing 130, a shaft 141 is positioned parallel with the output shaft of the motor 140 and supported on the left and right inner walls of the housing 130 by a pair of bearings 142a and 142b so as to be free to rotate. On the shaft 141, an idler gear 143 is fixed close to the bearing 142a to the side of the motor 140, while a pair of pinions 144 are fixed between the idler gear 143 and the other bearing 142b. Furthermore, on the output shaft of the motor 140, a small gear 145 is fixed and meshes with the idler gear 143, while the pinions 144 mesh with the bottom surface of the helical rack 151.

Accordingly, the rotational drive force of the motor 140 is transferred to the small gear 145, the idler gear 143 and the shaft 141, and the rotational drive force is converted to linear drive force by the pinions 144 and the helical rack 151, thereby causing reciprocal movement of the film holder that has been loaded between the rack carriage 150 and the holder carriage 160. In addition, the motor 140 is such that the rotational angle of one step has been determined beforehand, so that rotational driving is possible, for example, in 0.9 degree increments for each step corresponding to one image on the film strip in the film holder 10 that has been loaded.

The rack carriage 150 and the holder carriage 160 are guided so as to be capable of reciprocating movement by a left and right pair of top rods 170 and bottom rods 171 that are provided orthogonal to the shaft 141. In addition, one edge of the side of each top rod 170 separated from the front panel 24 is supported by the rack carriage 150, while the edge of the side adjacent to the front panel 24 is supported so as to be capable of a small amount of vertical movement.

In addition, one edge of each of the top rods 170 is pressed downward by a spring 180, pressing the helical racks 151 to the pinions 144 so that all are meshed. Furthermore, the pinions 144 also operate as pivot shafts that causes rotation of the helical racks 151.

A rod-shaped focussing cam member 190 is positioned parallel to the top rods 170 and is supported by the right and left inner walls of the housing 130 so as to be free to rotate at the other edge of each of the top rods 170 on the front panel side.

On the focussing cam member 190, a left and right pair of ring-shaped grooves 191 and 191 are formed off center, and the other end of the left and right pair of top rods 170 on the front panel 24 side are supported in the ring-shaped grooves 191. In addition, a disk-shaped focussing knob 192 is fixed to one end of the focussing cam member 190 so as to be concentric with such, and a portion of the focussing knob 192 protrudes from a slot 28 formed in the front panel 24. By manually causing rotation of the focussing knob 192 that protrudes from the slot 28, it is possible to cause rotation of the focussing cam member 192, thereby causing the height of the top rods 170 to move up and down by means of the ring-shaped grooves 191. Furthermore, it is possible to adjust the position of the film surface up and down (about 1 mm) by causing the rack carriage 150 and the holder carriage 160 to rise and fall by means of the top rods 170.

The scanning unit 120 also includes an eject plate 200 that contacts the film holder 10 and moves with the scanning unit 120 between the rack carriage 150 and the holder carriage 160 so as to be capable of appearing and disappearing inside the movement space of the film holder 10 by means of an unrepresented eject mechanism.

The mechanical chassis 22 also includes an illumination optical unit 210 that is positioned below the scanning unit 120 and illuminates the images on the film strip in the film holder 10 above with LED light. An image reading unit 220 is positioned above the scanning unit 120 and reads the images from the LED light that has transilluminated one image of the film strip.

The illumination optical unit 210 includes an illumination base 211 that is attached by screws to the mechanical chassis 22; an LED block 212 that is fixed to the back side bottom of the illumination base 211 and shines a plurality of LED light beams toward the front panel 24; a toric mirror 213 that is positioned on the front panel 24 side of the bottom of the illumination base 211 and reflects the LED light from the LED block; a 40° mirror 214 that bends the LED light from the toric mirror 213 toward the film strip above; and an illumination system lid 215 that causes a slit to open above the position of the 400 mirror 214 and transmits the LED light to outside the illumination optical unit 210 by means of this slit, while also including a top surface for the illumination optical unit 210.

The image reading unit 220 is equipped with: a 45° reflective mirror 221 that bends the LED light from the illumination optical system 210, the light having transilluminated one image of the film strip toward the back at a right angle; a projection lens 222 that causes the LED light from the 45° reflective mirror 221 to be composed into an image; a CCD 225 that is attached to the mechanical chassis 22 by means of screws via a base plate 224 mounted on a CCD holder 223; and a projection system lid 226 that covers the area underneath the projection lens 222.

Next, the operation of the above-described image reading device 20 will be described.

First, the film holder 10 is inserted into the insertion opening 26 of the image reading device 20. When the film holder 10 is inserted, the edge surface of the adapter 40 comes into contact with the eject plate 200. In addition, the width and thickness of the space between the rack carriage 150 and the holder carriage 160 are determined beforehand so that when the film holder 10 has been pressed from the insertion opening 26, the film holder can be implemented between the rack carriage 150 and the holder carriage 160.

Next, the film holder 10 is conveyed to the image reading position by the rack carriage 150 and the holder carriage 160. Following which, one image that faces the window 72 and 92 is positioned toward the front in the direction of insertion of the film holder. The image is illuminated by the LED light from the illumination optical system 210 and is read by the CCD 225.

When ejection of the film holder 10 is commanded, the rack carriage 150 and holder carriage 160 move toward the back, exceeding the image reading range, while the eject plate 200 protrudes into the movement area of the film holder 10. Following this, the eject plate 200 contacts a portion of the mechanical chassis and is engagingly stopped, while the rack carriage 150 and holder carriage 160 continue to move to the back. As a result, the edge surface of the adapter 40 of the film holder 10 contacts the eject plate 200 and the film holder 10 is pressed toward the insertion opening relative to the rack carriage 150 and the holder carriage 160. The rack carriage 150 and the holder carriage 160 then return to the position for receiving the film holder 10. Because the film holder 10 protrudes from the front panel 24, it is possible to remove the film holder 10 with ease.

In order to change the frame of the film strip, it is preferable to cause the holder main body 30 to slide relative to the adapter 40 after having been inserted into the insertion opening. When this kind of sliding is caused, it becomes possible to read images on the film strip up to the three frames positioned toward the front in the direction of insertion of the film holder.

In order to read the images on the three frames positioned to the back in the direction of insertion of the film holder 10, it is preferable to cause the film holder 10 to be inserted into the insertion opening after being reversed and rotated by 180°. Furthermore, by causing the holder main body 30 to slide relative to the adapter 40, it is possible to read the images on the remaining three frames without having to switch the film strip.

The characteristics of the second aspect are that identification marks used to identify the front and back surfaces of the film original, for example notches 41, are provided on the film holder 10. The corners of the adapter 40 of the film holder 10 are cut away into triangular shapes, thereby forming the notches 41. The notches 41 are formed at both ends of the adapter 40 in the direction of insertion. Furthermore, each of the notches 41 is positioned on the left side when facing the direction of insertion.

With the second aspect, notches 41 are formed as identification marks, but it would be appropriate to instead form indentations, protrusions, grooves or holes.

In addition, the identification marks are formed in the adapter 40 of the film holder, but this is also intended to be illustrative and not limiting, for it would be appropriate to form these marks in the holder main body 30, or in both the holder main body 30 and the adapter 40.

Furthermore, components that are the same as in the above-described first embodiment are labeled with the same symbols, and detailed description of such is omitted here.

Next, the order for using the film holder 10 provided with the above-described composition will be described.

Figure 7:
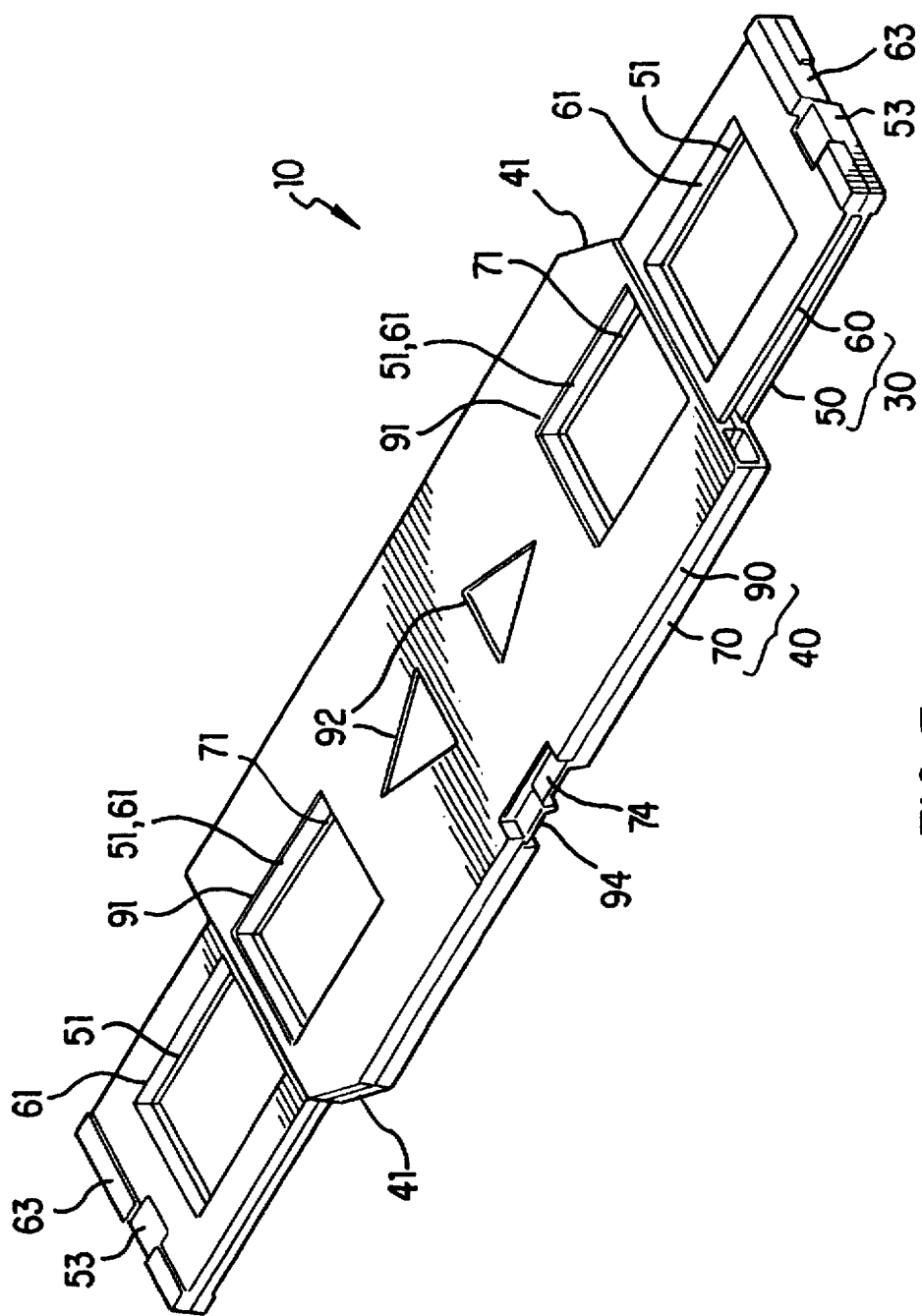
FIG. 7 is a perspective view showing a second embodiment of the film holder according to the present invention.

First, a film original is loaded into the film holder 10. At this time, the film is loaded so that the front surface of the film original is positioned upward in FIG. 7.

Following this, the film holder 10 into which the film original has been loaded is inserted from the insertion opening 26 of the image reading device 20.

Figure 8:
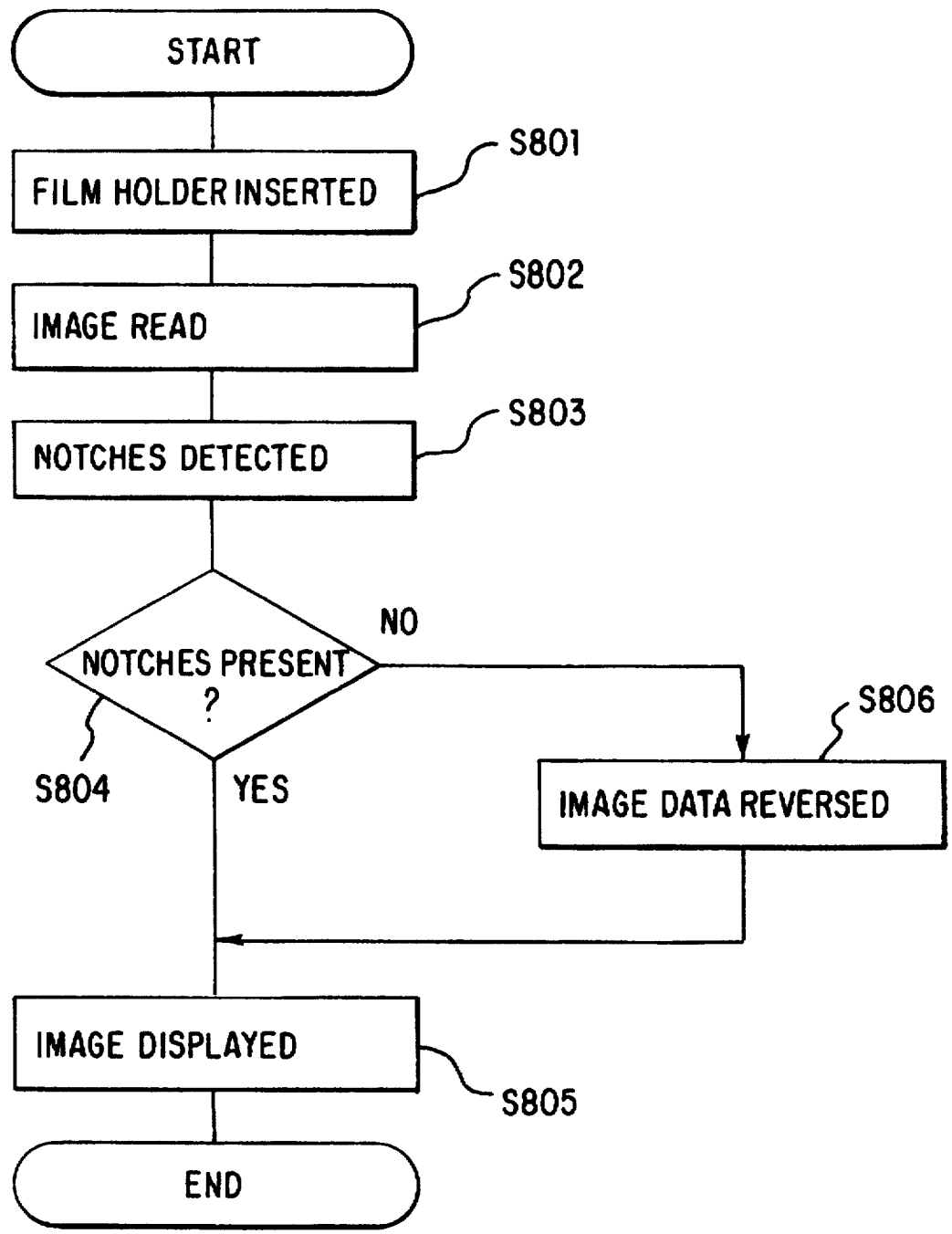
FIG. 8 is a flowchart showing the operations of the image reading device using the film holder of FIG. 7.
Figure 9:
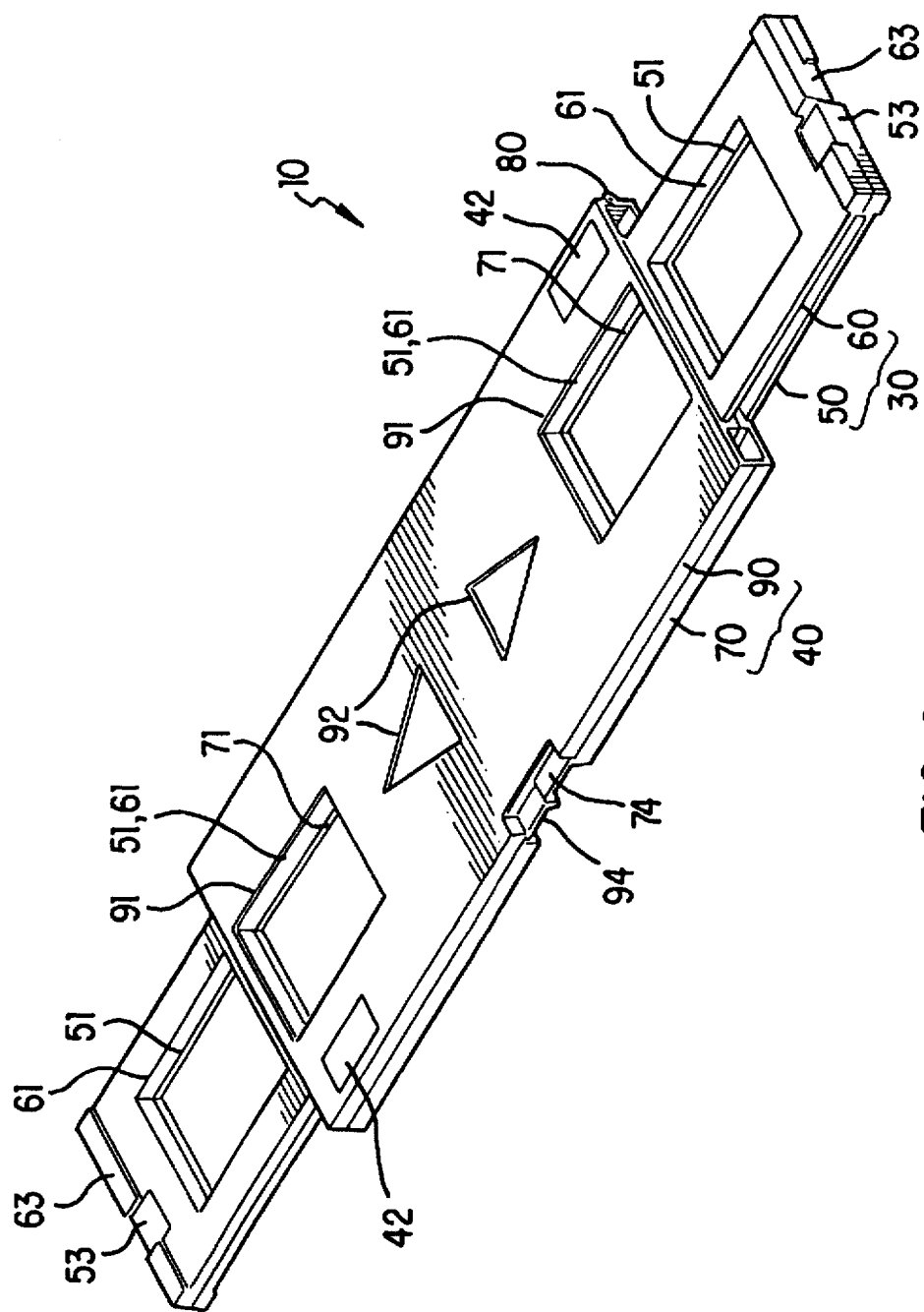
FIG. 9 is a perspective view showing a third aspect of the film holder.
Figure 10:
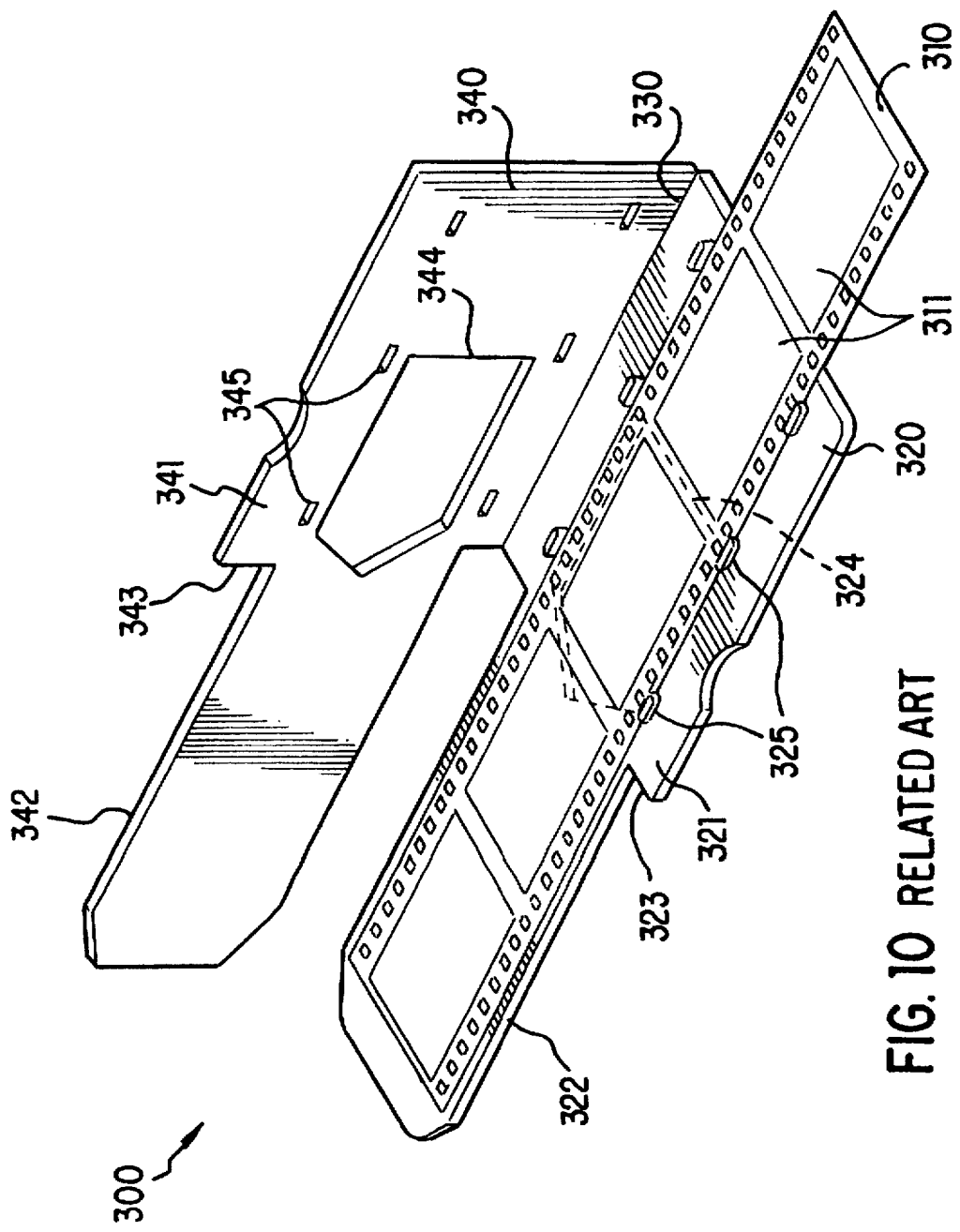
FIG. 10 is a perspective view showing the opened state of one example of a conventional film holder.

Next, the operations of the image reading device 20 will be described with reference to the flowchart shown in FIG. 8.

First, in step S801, the film holder 10 into which the film original has been loaded is inserted into the insertion opening 26 of the image reading device.

Next, the program moves from step S801 to step S802 and image reading is conducted. The image reading is conducted by the CCD 225 inside the image reading device 20, and image data is output from the CCD 225.

The program moves from step S802 to step S803 and detection of the notches 41 in the film holder 10 is conducted. The detection is conducted by an identification mark detection device 350 inside the image reading device 20.

The identification mark detection device 350, an optical sensor for example, is positioned inside the image reading device and the absence or presence of the notches 41 in the film holder 10 is detected by the optical sensor. When the notches 41 in the film holder 10 are detected by the above-described kind of optical sensor, a detection signal is output from the optical sensor.

Figure 11:
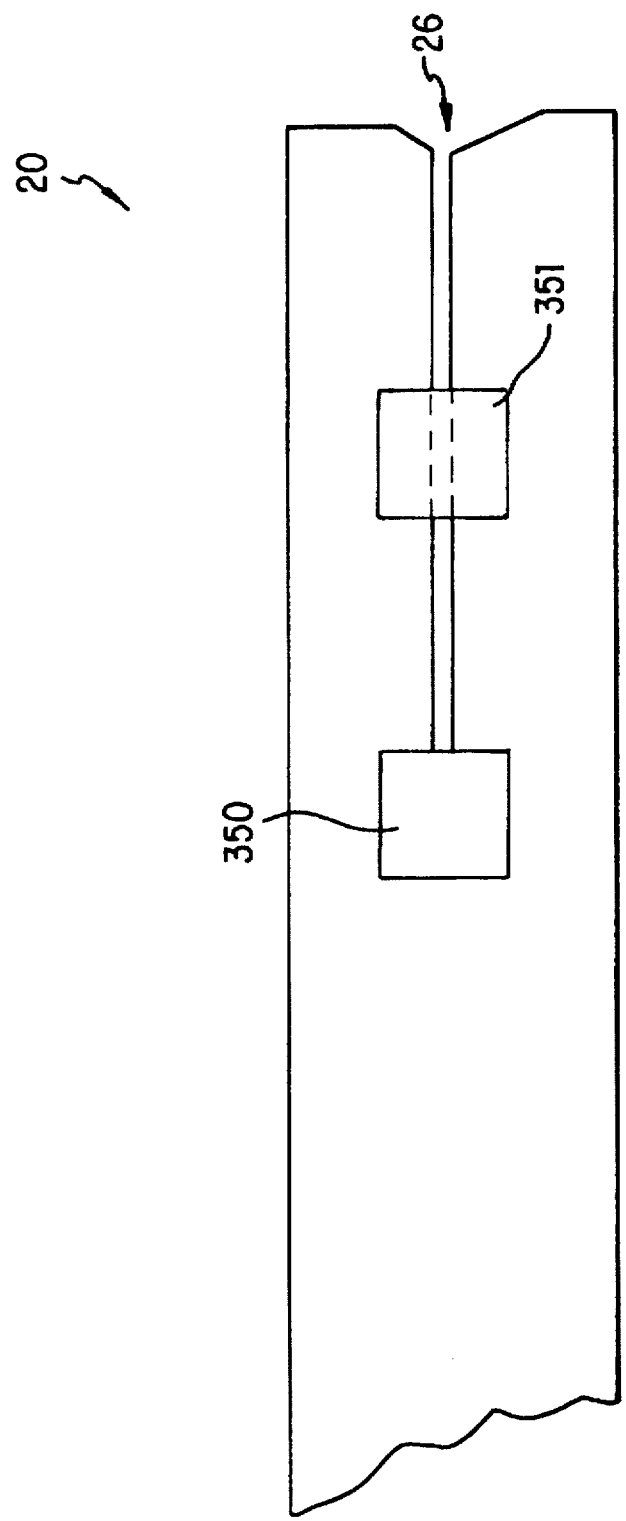
FIG. 11 is an schematic view illustrating image reading and reversing devices of the present invention.

The identification mark detection device 350 (FIG. 11) is not limited to an optical sensor, for it would also be appropriate to mechanically detect the notches 41 in the film holder 10 using a micro switch or the like.

Next, the program moves from step S803 to step S804 where a determination is conducted as to whether the notches 41 in the film holder 10 are present. The determination is conducted by an image data reversing device 351 (FIG. 11) in the image reading device 20.

The image data reversing device 351 determines the front and back direction of the film holder 10 and ultimately the front and back direction of the film original that is held in the film holder 10 through the absence or presence of a detection signal from the above-described optical sensor.

Furthermore, when it is determined in step S804 that the notches 41 in the film holder 10 are present, the program moves to step S805 and the image data reversing device 351 outputs the image data that has been output from the CCD 225.

As a result, the image as read by the CCD 225 is displayed on the display of an external personal computer or the like, although such is not represented in the drawings.

When it is determined in step S804 that the notches 41 in the film holder 10 are absent, i.e., when the film holder 10 has been inserted with front and back reversed, the program moves to step S806.

In step S806, the image data is reversed. When the film holder 10 has been inserted with front and back reversed, the images on the film original that has been loaded into the film holder 10 are read by the CCD 225 with front and back surfaces reversed. Consequently, the image data reversing device 351 outputs the data after reversing the front and back surfaces thereof when the image data output from the CCD 225 is displayed.

As a result, the images are displayed with front and back surfaces reversed relative to the image that was read by the CCD 225, so that the images on the film original are correctly displayed on the display of an external personal computer or the like.

Because there are also cases where an error is made in the front and back direction of the film original when loading such into the film holder 10, it is also possible to cause the display to be reversed through a manual operation. When an error is made in the front and back direction of the film original, the configuration allows switching so that when it is determined in step S804 that the notches 41 of the film holder 10 are present, the program moves to step S806, while conversely, when the determination is that these notches are absent, the program moves to step S805.

In addition, the operation of the image data reversing device may also be executed by a host computer connected to the picture image reading device. Further, the operation of the image reading device can be implemented as a single special purpose integrated circuit (e.g., ASIC) having a main or central processor section for overall, system-level control, and separate sections dedicated to performing various different specific computations, functions and other processes under control of the central processor section.

It will be appreciated by those skilled in the art that the operation of the image reading device can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The operation of the image reading device including carrying out the flow chart shown in FIG. 8 can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing a program of the invention can be used for the operation of the image reading device.

The characteristic of the third aspect is that magnetic tape 42, for example, is attached to the adapter 40 of the film holder 10 as identification marks for the purpose of identifying the front and back surfaces of the film original.

In the third aspect, the magnetic tape 42 is read by a magnetic sensor as the identification mark detection device 350.

The tape which serves as the identification mark is not limited to magnetic tape 42, for it would also be appropriate to attach tape in which the reflectivity changes and to read the tape 42 using an optical sensor.

In addition, the magnetic tape 42 is attached to the adapter 40, but it would also be appropriate to attach the tape to the holder main body 30 or to both the holder main body 30 and the adapter 40.

Furthermore, components the same as those in the above-described first embodiment are labeled with the same symbols and detailed explanation of such is omitted here.

Because the present invention has the above-described configuration, the following results are produced.

The invention according to the first embodiment produces the following results. With the invention according to the first embodiment, it is possible to provide a film holder in which it is easy to change frames of the film original by causing the holder main body to slide relative to the adapter.

With the invention according to the second aspect, it is possible to provide a film holder in which determining of positions during frame scrolling is easy.

With the invention according to the third aspect, it is possible to provide a film holder in which position deviances can be prevented when changing the film original.

With the invention according to the fourth aspect, it is possible to provide a film holder in which changing frames of the film original can be easily accomplished by merely changing the direction of insertion of the adapter.

With the invention according to the fifth aspect, it is possible to provide a film holder in which identifying the front and back surfaces of the film original can be accomplished by means of identification marks formed in the film holder.

With the invention according to the sixth aspect, it is possible to provide a film holder in which detection of the identification marks is easy by forming the identification marks on the non-sliding adapter.

With the invention according to the seventh aspect, it is possible to provide a film holder in which identifying the front and back surfaces of the film original can be accomplished from the external appearance of the film holder by forming the identification marks using notches.

With the invention according to the eighth aspect, it is possible to provide an image reading device that uses a film holder in which changing of the film holder is unnecessary.

The invention has been described in accordance with preferred embodiments thereof with reference to the drawings, which are intended to be illustrative, not limiting. Various modifications will be apparent to those skilled in the art without departing from the spirit and scope of the present invention, as defined in the appended claims.

What is claimed is:

1. A film holder for holding a film original having a plurality of frames arranged in a row, comprising:
   a holder main body capable of holding the film original, said holder main body having a plurality of openings that face each of the plurality of frames of the film original;
   an adapter capable of supporting the holder main body so that the holder main body is slidable relative to the adapter, said adapter having a window that selectively coincides with at least one of the plurality of openings of the holder main body; and
   an identification mark for identifying a front and a back surface of the film original formed on at least one of the holder main body and the adapter.

2. The film holder according to claim 1, further comprising:
   a temporary stop between the holder main body and the adapter, said temporary stop being configured to regulate sliding of the holder main body relative to the adapter and to have a plurality of stop positions, each of the plurality of stop positions corresponding to a position where one of the plurality of openings of the holder main body and the window of the adapter mutually coincide.

3. The film holder according to claim 2, wherein the holder main body comprises:
   a holder bottom portion configured to hold a bottom surface of the film original; and
   a holder cover configured to overlap with the holder bottom portion opposite the film original so that the film original is interposed between the holding cover and the holder bottom portion.

4. The film holder according to claim 3, wherein the adapter comprises:
   an adapter bottom configured to hold the holder bottom portion so that sliding is possible;
   an adapter cover hingedly connected to the adapter bottom portion between open and closed positions, wherein said adapter cover is configured to hold the holder cover so that sliding is possible; and
   a slide prevention device provided between the holder main body and the adapter, said slider prevention device being configured to prevent sliding of the holder main body relative to the adapter when the adapter cover is in the open position.

5. The film holder according to claim 1, comprising:
   a window formed in the adapter at a position separated from the plurality of frames of the film original; and
   an instruction mark for indicating and displaying an insertion direction of the adapter.

6. The film holder according to claim 1, wherein the identification mark is formed on an end of the adapter.

7. The film holder according to claim 6, wherein the identification mark comprises a notch.

8. The film holder according to claim 6, wherein the identification mark comprises a magnetic tape.

9. The film holder according to claim 1, further comprising:
   an image reading device for inserting the film holder and reading the film held in the film holder that has been inserted thereinto through the opening in the film holder, wherein said image reading device comprises an identification mark detection device for detecting an identification mark on the film holder and outputting a detection signal; and
   an image data reversing device for determining a direction of a surface of the film holder, said image data reversing device reversing the direction of the image data when the detection signal indicates that the film holder has been inserted from a back surface direction.

10. An image reading device for reading film having a plurality of frames arranged in a row, said image reading device comprising:
    a film holder having:
       a holder main body capable of holding the film, said holder main body having a plurality of openings that face each of the plurality of frames of the film;
       an adapter capable of supporting the holder main body so that the holder main body is slidable relative to the adapter, said adapter having a window that coincides with at least one of the plurality of openings of the holder main body; and
    a scanning unit for scanning the film within the film holder; and
    an image data reversing device that reverses a direction of the image data when a detection signal indicates that the film holder has been inserted from a back surface direction.

11. The image reading device according to claim 10, wherein the image reading device further comprises an identification mark detection device that detects an identification mark on the film holder and outputs a detection signal.

12. The image reading device according to claim 11, wherein the image reading device further comprises:
a casing connected to a mechanical chassis; the casing having a body forming a casing bottom surface;
a front panel formed on a front surface of the body and a top cover extending parallel to the body from a top edge of the front panel;
an insertion opening formed on the front panel in front of the scanning unit; and
an ejection device that ejects the film holder on command.

13. The image reading device according to claim 12, wherein the scanning unit includes a housing that contacts an edge of the front panel facing the insertion opening, and wherein a stepping motor includes an output shaft facing the housing formed on a side wall of the housing.

14. The image reading device according to claim 13, wherein the housing includes a rack carriage that is driven by the stepping motor, and wherein a holder carriage is formed integrally with the rack carriage with a predetermined spacing so that the film holder is interposed in a space between the holder carriage and the rack carriage.

15. A method for reading a film having a plurality of frames with an image reading device having a holder main body including a plurality of openings and an adapter including a window, said film being inserted between the holder main body and the adapter, the method comprising:
aligning at least one of the plurality of openings to coincide with the window to form a coinciding opening;
reading an image of a selected frame of the film that faces the coinciding opening;
sliding the holder main body relative to the adapter to align a different one of the plurality of openings to coincide with the window;
indicating the direction of insertion of the adapter using an instruction mark;
inserting the film into the adapter based on the instruction mark; and
identifying the front and back surfaces of the film original using an identification mark.

16. The method according to claim 15, further comprising temporarily restricting the sliding of the holder main body at one of a plurality of positions where one of the plurality of openings and the window mutually coincide.

17. The method according to claim 15, further comprising preventing the holder main body from sliding during changing of the film;
loading the film in the holder main body with the adapter in an open position; and
preventing sliding of the holder main body relative to the adapter.

18. The method according to claim 17, further comprising reversing the image when no identification mark is identified.

19. The method according to claim 18, wherein the image reading device includes an ejection device, a scanning unit, an image data reversing device and an identification mark detection device and the method further comprises:
reversing the image using the image data reversing device if no detection signal is output from the identification mark detection device;
reading and displaying the image using the scanning unit; and
ejecting the film holder after an ejection command.

* * * * *